United States Patent [19]

Niedospial, Jr. et al.

[11] Patent Number: 4,887,112
[45] Date of Patent: Dec. 12, 1989

[54] FILM CASSETTE

[75] Inventors: John J. Niedospial, Jr.; Jeffrey C. Robertson, both of Rochester; Mark D. Fraser, Brockport, all of N.Y.

[73] Assignee: Eastman Kodak Company, Rochester, N.Y.

[21] Appl. No.: 296,551

[22] Filed: Jan. 12, 1989

[51] Int. Cl.⁴ .............................................. G03B 17/26
[52] U.S. Cl. ................................... 354/275; 242/71.1
[58] Field of Search ................... 354/216, 275; 242/71, 242/71.1, 71.8, 71.9

[56] References Cited

U.S. PATENT DOCUMENTS

| | | | |
|---|---|---|---|
| 988,341 | 4/1911 | Hill | 242/71 |
| 2,541,476 | 2/1951 | Mihalyi | 242/71 |
| 3,234,024 | 2/1966 | Leinonen | 242/71 |
| 3,659,799 | 5/1972 | Cerutti et al. | 242/71.9 |
| 3,677,499 | 7/1972 | Wangerin | 242/210 |
| 3,797,777 | 3/1974 | Hosono et al. | 242/71.8 |
| 4,407,579 | 10/1983 | Huff | 354/275 |
| 4,423,943 | 1/1984 | Gold | 354/275 |
| 4,834,306 | 5/1989 | Robertson et al. | 354/275 X |
| 4,841,319 | 6/1989 | Hansen | 354/275 |

Primary Examiner—L. T. Hix
Assistant Examiner—Brian W. Brown
Attorney, Agent, or Firm—Roger A. Fields

[57] ABSTRACT

A film cassette is disclosed wherein a film spool having a film roll coiled about it is rotated in an unwinding direction to advance a leading section of the film roll into and through a film passage slit to the outside of the cassette shell. The film spool includes a pair of annular constraining lips coaxially disposed on the spool core to space the outermost convolution of the film roll from an interior curved wall of the cassette shell. The leading section of the film roll is tapered asymetrically and is relatively short to allow it to protrude from between the constraining lips and into slight contact with the shell wall.

When the film spool is initially rotated in the unwinding direction, the spool core is rotated relative to the constraining lips until there results a firm non-slipping relation between the outermost convolution and the lips, to thus cause the lips to be rotated thereafter with the spool core. The non-slipping relation imparts a beam strength to the leading section of the film roll which, when the film spool is rotated in the unwinding direction, combines with the asymetric design of the leading section to increase the likelihood that the leading section will feed into the film passage slit.

4 Claims, 6 Drawing Sheets

FILM CASSETTE

CROSS-REFERENCE TO RELATED APPLICATIONS

Reference is made to commonly assigned copending applications Ser. No. 173,393, entitled FILM CASSETTE, and filed Mar. 25, 1988 in the name of Robert P. Cloutier, Ser. No. 173,396, entitled FILM CASSETTE, and filed Mar. 25, 1988 in the names of Jeffrey C. Robertson and Mark D. Fraser, and Ser. No. 193,323, entitled FILM CASSETTE, and filed May 12, 1988 in the name of Jeffrey C. Robertson.

BACKGROUND OF THE INVENTION

1. Field of the Invention

The invention relates generally to the field of photography and particularly to a film cassette containing roll film.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance the filmstrip out of the cassette shell by rotating the film spool in the unwinding direction. The film leader normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width which is slightly less than the width of the filmstrip, thus resulting in the filmstrip being transversely bowed as it is uncoiled from the film spool, and thereby facilitating movement of the film edges under the circumferential lips of the respective flanges. However, transverse bowing of the filmstrip to move its longitudinal edges under the circumferential lips results in increased friction between the filmstrip and the cassette shell which will impede advance of the filmstrip from the shell and may damage the filmstrip. Another problem arises from the fact that the leading end of the filmstrip appears to be approximately 1⅛ inch to 1¼ inch long-judging by the number of perforations illustrated in the leading end. In a high temperature and/or humidity environment, the ability of the filmstrip to clock-spring outwardly when coiled about the spool is lessened, and there is more of a tendency of the filmstrip to curl inwardly. Consequently, the leading end because of its length may curl away from the shell wall, whereupon it may be unable to gain access to the film passageway when the film spool is rotated in the unwinding direction.

The Cross-Referenced Applications

Like the type of film cassette disclosed in U.S. Pat. No. 4,423,943, cross-referenced applications Ser. Nos. 173,396 and 193,323, each disclose a film cassette that contains a non-protruding film leader which is automatically advanced to the outside of the cassette shell in response to rotation of the film spool in the unwinding direction. Specifically, there is disclosed a film cassette wherein a convoluted film roll is wound on a spool between a pair of coaxially spaced, independently rotatable flanges. The two flanges have respective circumferential annular lips which prevent the outermost convolution of the film roll, including the leading film end, from clock-springing into contact with the interior wall of the cassette shell. When the spool is initially rotated, the flanges momentarily remain stationary and the film roll, since its inner end is secured to the spool, tends to expand radially to ensure a firm non-slipping relation between the outermost convolution and the annular lips. Once the non-slipping relation exists, rotation of the spool will rotate the flanges. This allows stationary internal spreaders to deflect successive portions of the annular lips to an axial dimension exceeding the film width, in turn allowing the leading end and successive sections of the outermost convolution to exit from the radial confinement of the lips without damaging the filmstrip, and to advance to the outside of the cassette shell. If the film cassette disclosed in either of these cross-referenced applications is used during extremely high temperature and/or humidity conditions, it might be possible that the leading end of the film roll after being freed from the radial confinement of the annular lips will retain a great deal of inward curl. Consequently the leading end will not have sufficient clock-spring to be picked up by a stripper-guide in the cassette shell which is adapted to direct the leading end into a film passage slit to the outside of the cassette shell.

The film cassette disclosed in cross-referenced application Ser. No. 173,393 like the ones disclosed in the other two cross-referenced applications contains a non-protruding film leader which is automatically advanced to the outside of the cassette shell in response to unwinding rotation of the film spool. However, in this instance the outermost convolution of the film roll is radially constrained by several projections fixed to the respective undersides of the two flanges. It has been determined that these projections do not operate to radially constrain the outermost convolution as well as the continuous annular lips depicted in the other two applications.

SUMMARY OF THE INVENTION

The invention advantageously solves the problems described above by providing an improved film cassette wherein the leading section of the filmstrip is more easily able to seek entry to the outside of the cassette shell. Specifically, there is provided an improved film cassette wherein (a) an outermost convolution of a film roll coiled about a spool core is radially constrained by respective annular lips of a pair of flanges on the spool core to prevent the outermost convolution from contacting an interior wall of the cassette shell, (b) a trailing end of the film roll is secured to the spool core, and a leading section of the film roll is reduced in width to allow it to protrude from between the annular lips and rest against the shell wall, and (c) rotation of the spool core and the flanges in an unwinding direction operates to automatically advance the leading section into and through a film passage slit to the exterior of the cassette shell, and wherein the improvement comprises:

said spool core is coaxially coupled with the flanges to allow initial rotation of the spool core relative to the flanges in the unwinding direction to urge the film roll to expand radially until there is achieved a non-slipping relation between the outermost convolution and the annular lips, to thus cause the flanges to be rotated with the spool core when the spool core is further rotated in the unwinding direction; and said leading section converges substantially similarly along opposite longitudinal edges to allow the edges to equally separate from the respective lips, and it has a very short length as compared to the outermost convolution to allow only a relatively small forward portion of the leading section to contact the shell wall, whereby the leading section is more easily able to seek entry to the film passage slit. It is believed that the non-slipping relation established between the outermost convolution and the annular lips, when the spool core is rotated relative to the flanges to urge the film roll to expand radially, imparts a beam strength or longitudinal rigidity to the forward portion of the leading section that contacts the shell wall. This aspect of the invention, combined with the design of the leading section, negates the tendency of the leading section to curl inwardly in high temperature and/or humidity conditions and it therefore enhances the ability of the leading section to seek entry to the film passage slit.

In a preferred embodiment of the invention, the forward portion of the leading section that contacts the shell wall is triangularly shaped. More particularly, a forward edge of the forward portion is configured to define a leading tip proximate one of the longitudinal edges of the leading section. This design it has been found increases the likelihood that the leading section will feed to the film passage slit when the spool core and the flanges are rotated in the unwinding direction.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
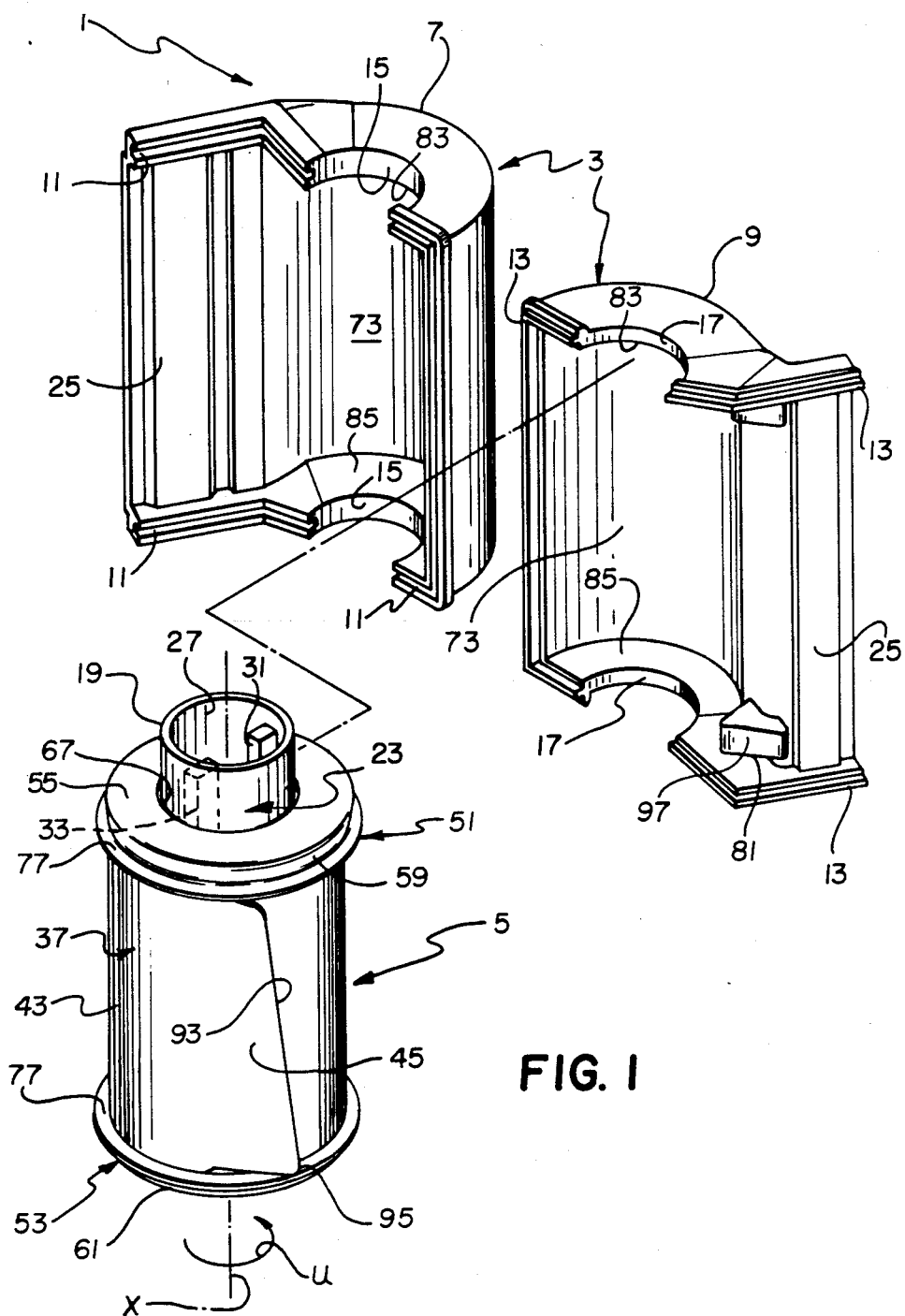
FIG. 1 is an exploded perspective view of an improved film cassette according to a preferred embodiment of the invention.
Figure 2:
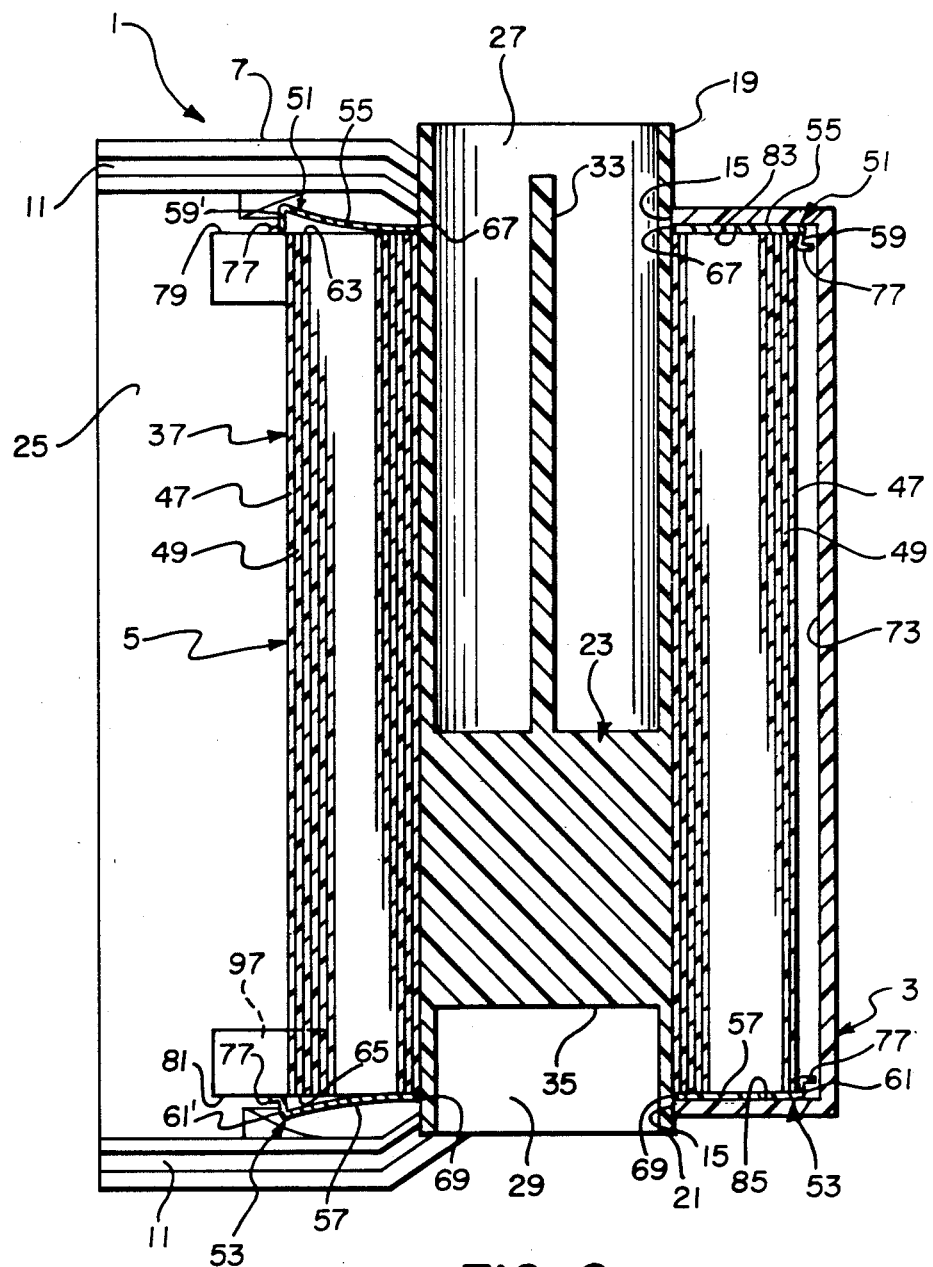
FIG. 2 is an elevation view in cross-section of the film cassette.
Figure 3:
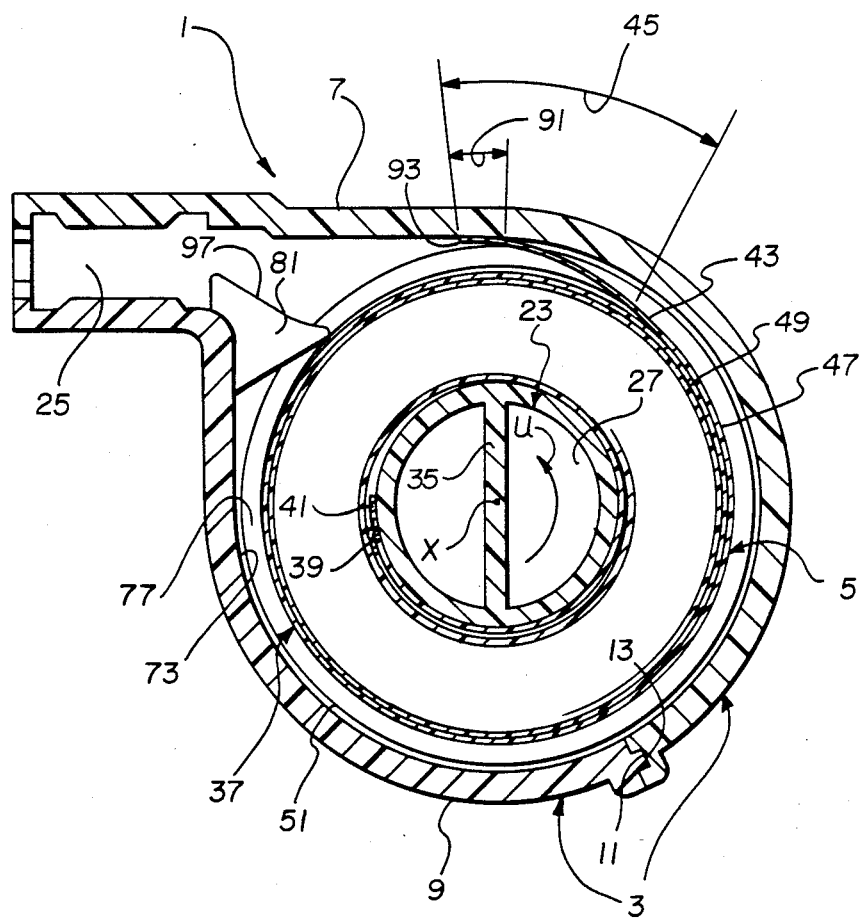
FIG. 3 is an end view in cross-section of the film cassette.

Referring now to the drawings, FIGS. 1-3 depict an improved 35 mm film cassette 1 comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known black velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a winding direction opposite to the unwinding direction.

A roll 37 of convoluted 35 mm film is coiled about the spool core 23. As indicated in FIG. 3, the film roll 37 has an inner or trailing end 39 attached to the spool core 23 by a suitable piece of adhesive tape 41 and a relatively long film leader 43, e.g. 6⅜ inches long. The film leader 43 has a leading section 45 and further comprises 2-3 convolutions of the film roll 37. One of these leader convolutions is the outermost convolution 47 and another of them is the next inward succeeding convolution 49.

Figure 4:
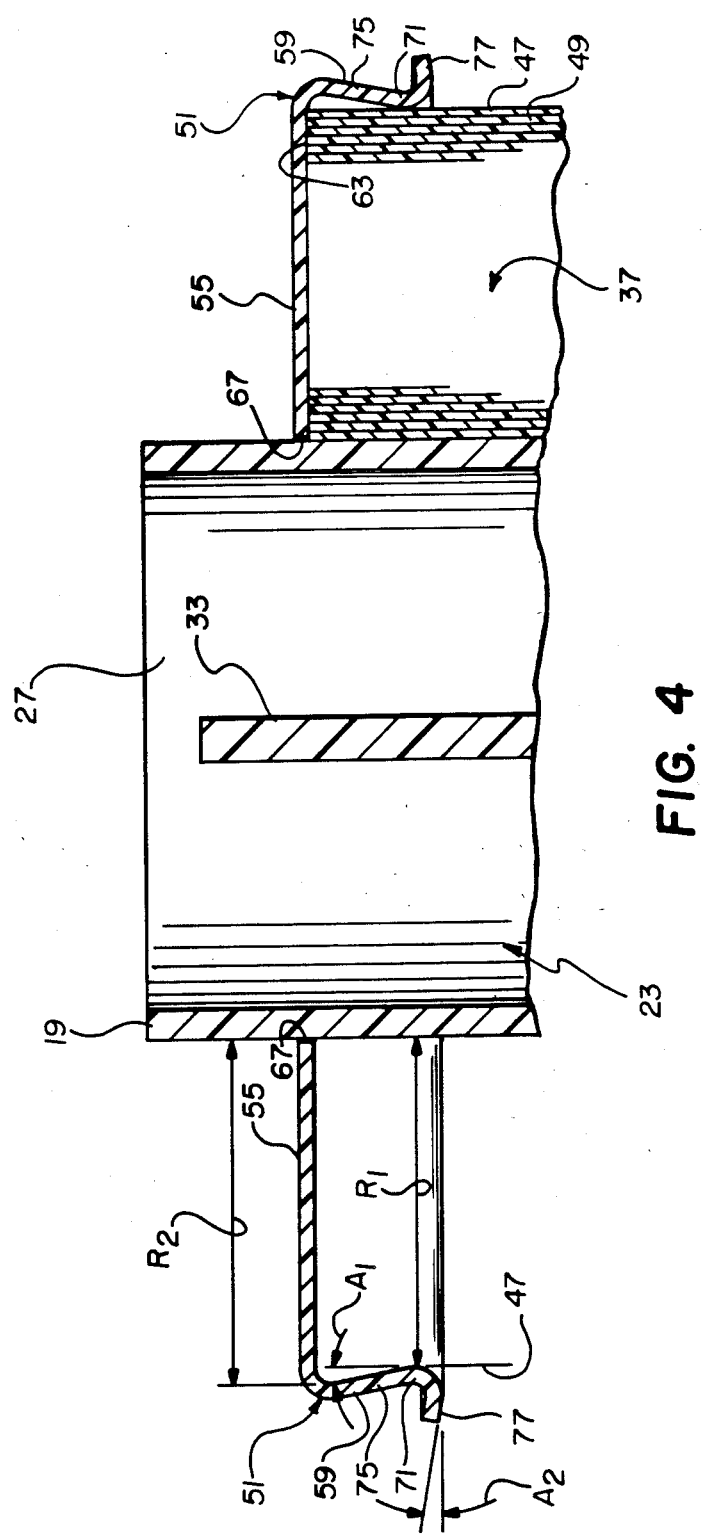
FIG. 4 is an elevation view in cross-section of one of a pair of coaxial flanges and a spool core in the film cassette.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the annular lips 59 and 61 as depicted in FIG. 4 includes the following:

(1) an an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner curved wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45′, for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate corresponding locations inwardly of the film passage slit 25 as shown in FIG. 2. The respective spreader surfaces 79 and 81 deflect opposite limited portions 59′ and 61′ of the annular lips 59 and 61 axially away from each other to an axial dimension slightly exceeding the general film width. See FIG. 2. In essence, the deflected portions 59′ and 61′ of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semi-circular flat surfaces 83 and 85 of the cassette shell 3. The flat surfaces 83 and 85 abut the respective disks 55 and 57, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59′ and 61′ of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips 59 and 61 is useful during assembly of the film cassette 1, to position either of the spreader surfaces 79 and 81 relative to an annular free end section.

Figure 5:
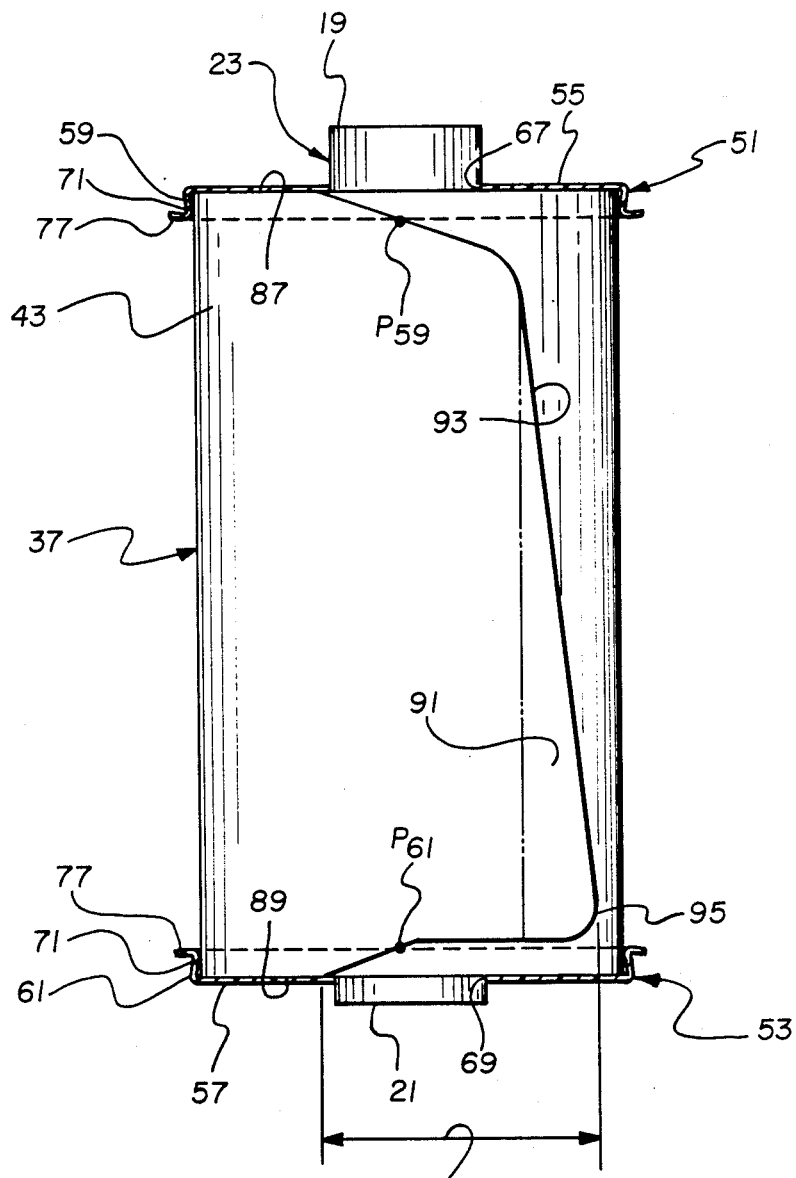
FIG. 5 is an elevation view of the coaxial flanges and the spool core, illustrating the original position of a leading section of a film roll coiled about the spool core.
Figure 6:
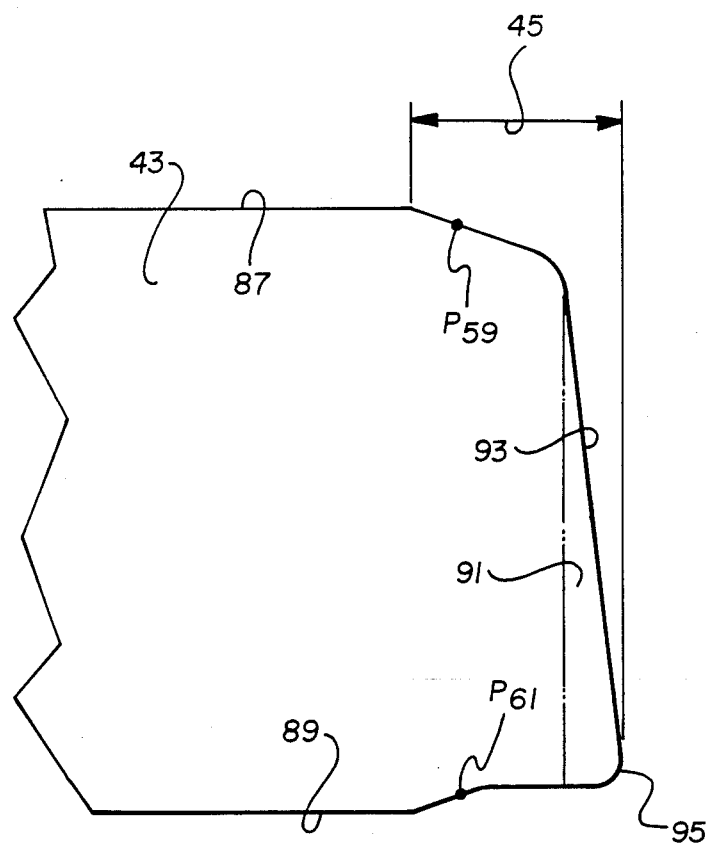
FIG. 6 is a plan view of the leading section of the film roll.

FIGS. 1, 3, 5, and 6 depict the leading section 45 of the film leader 43. The leading section 45 converges or tapers substantially similarly along opposite longitudinal edges 87 and 89 of the film leader 43 to equally separate from the annular lips 59 and 61 at corresponding exit points $P_{59}$ and $P_{61}$ on the two lips as shown in FIG. 5, and it has a very short length, e.g. ⅜ inch, as compared to the length of the outermost convolution 47 of the film leader, e.g. 3¼ inches, to allow only a relatively small forward portion 91 of the leader section to contact the inner wall 73 of the cassette shell 3. The forward portion 91 that contacts the shell wall 73 as shown in FIGS. 5 and 6 is triangularly shaped, and it has a forward inclined edge 93 which forms a forwardmost tip 95 proximate the longitudinal edge 89 of the film leader 45.

OPERATION

When the spool core 23 is initially rotated in the unwinding direction U, the two flanges 51 and 53 momentarily remain stationary and the film roll 37, since its inner end 39 is attached to the spool core, tends to expand radially or clock-spring to ensure a firm non-slipping relation between the outermost convolution 47 of the film roll and the annular lips 59 and 61 of the flanges. Then, further rotation of the spool core 23 in the same direction will similarly rotate the two flanges 51 and 53. As a result, the two spreader surfaces 79 and 81 will deflect successive portions 59′ and 61′ of the annular lips 59 and 61 axially away from each other as the respective portions are rotated past the spreader surfaces. The deflected portions 59′ and 61′ of the two lips 59 and 61 are returned to their original non-flexed condition by the semi-circular flat surfaces 83 and 85 of the cassette shell 3. As can be appreciated from FIG. 3, the forward portion 91 of the leading section 45 of the film roll 37 will first be advanced along the shell wall 73 to position its forward-most tip 95 onto a stripper-guide surface 97, integrally formed with the spreader surface 81. The stripper-guide surface 97 then acts to direct the forward portion 91 of the leading section 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 in the unwinding direction U will thrust the entire leader 43 to the outside of the cassette shell 3.

The annular constraining section 71 of each of the annular lips 59 and 61 provides an essentially radial contact between the two lips and the clock-springing film roll 37. This prevents any clock-springing of the film roll from generating an axial force against either of the flanges 51 and 53 which would severely increase the friction between the respective disks 55 and 57 and the semi-circular flat surfaces 83 and 85 of the cassette shell 3.

The invention has been described with reference to a preferred embodiment. However, it will be appreciated that variations and modifications can be effected within the ordinary skill in the art without departing from the scope of the invention.

We claim:

1. An improved film cassette wherein (a) an outermost convolution of a film roll coiled about a spool core is radially constrained by respective annular lips of a pair of flanges on said spool core to prevent said outermost convolution from contacting an interior wall of the cassette shell, (b) a trailing end of said film roll is secured to said spool core, and a leading section of the film roll is reduced in width to allow it to protrude from between said annular lips and rest against said shell wall, and (c) rotation of said spool core and said flanges in an unwinding direction operates to automatically advance said leading section into and through a film passage slit to the exterior of said cassette shell, and wherein the improvement comprises:

said spool core is coaxially coupled with said flanges to allow initial rotation of the spool core relative to the flanges in the unwinding direction to urge said film roll to expand radially until there is achieved a non-slipping relation between said outermost convolution and said annular lips, to thus cause the flanges to be rotated with the spool core when the spool core is further rotated in the unwinding direction; and said leading section converges substantially similarly along opposite longitudinal edges to allow said edges to equally separate from said respective lips and it has a very short length as compared to said outermost convolution to allow only a relatively small forward portion of the leading section to contact said shell wall, whereby said leading section is more easily able to seek entry to said film passage slit.

2. The improvement as recited in claim 1, wherein said leading section has a forward edge connecting its opposite longitudinal edges which is asymetrically shaped.

3. The improvement as recited in claim 2, wherein said forward edge substantially is inclined to form a forward-most tip proximate one of said longitudinal edges and remote from the other longitudinal edge.

4. The improvement as recited in claim 1, wherein said forward portion of the leading section that contacts said shell wall is substantially triangularly shaped.

* * * * *